United States Patent
Placko et al.

(10) Patent No.: US 6,935,119 B2
(45) Date of Patent: Aug. 30, 2005

(54) METHODS FOR OPERATING GAS TURBINE ENGINES

(75) Inventors: James Michael Placko, West Chester, OH (US); Lautaro Aspiazu Montgomery, Mason, OH (US); Robert Paul Coleman, Indian Springs, OH (US)

(73) Assignee: General Electric Company, Schenectady, NY (US)

( * ) Notice: Subject to any disclaimer, the term of this patent is extended or adjusted under 35 U.S.C. 154(b) by 241 days.

(21) Appl. No.: 10/389,519

(22) Filed: Mar. 14, 2003

(65) Prior Publication Data

US 2004/0177618 A1 Sep. 16, 2004

(51) Int. Cl.$^7$ .............................. F02C 3/30; F02C 9/20
(52) U.S. Cl. ............................ 60/775; 60/39.3; 60/794
(58) Field of Search .......................... 60/775, 794, 39.3, 60/39.53, 39.55

(56) References Cited

U.S. PATENT DOCUMENTS

| | | |
|---|---|---|
| 5,867,977 A | 2/1999 | Zachary et al. |
| 6,449,953 B1 | 9/2002 | Hook, Jr. et al. |
| 6,470,667 B1 * | 10/2002 | Payling et al. ............... 60/39.3 |
| 6,679,060 B2 * | 1/2004 | Hellat et al. .................. 60/775 |
| 2001/0003979 A1 | 6/2001 | Oki et al. |

* cited by examiner

Primary Examiner—Louis J. Casaregola
(74) Attorney, Agent, or Firm—William Scott Andes; Armstrong Teasdale LLP

(57) ABSTRACT

A method for operating a gas turbine engine including a high pressure compressor, a variable inlet guide vane assembly and a water injection apparatus for injecting water into a flow of the engine is provided. The method comprises transmitting engine operating parameters including a temperature of the gas flow at an outlet of the high pressure compressor, T3, to an engine controller, using the controller to regulate a flow of water injected into the gas flow and to adjust a relative position of the inlet guide vane assembly until engine full power is about reached as determined by a pre-defined T3 operating parameter limit, and adjusting the controller to then facilitate operation of the engine with an increased output without exceeding the pre-defined T3 operating parameter limit.

16 Claims, 13 Drawing Sheets

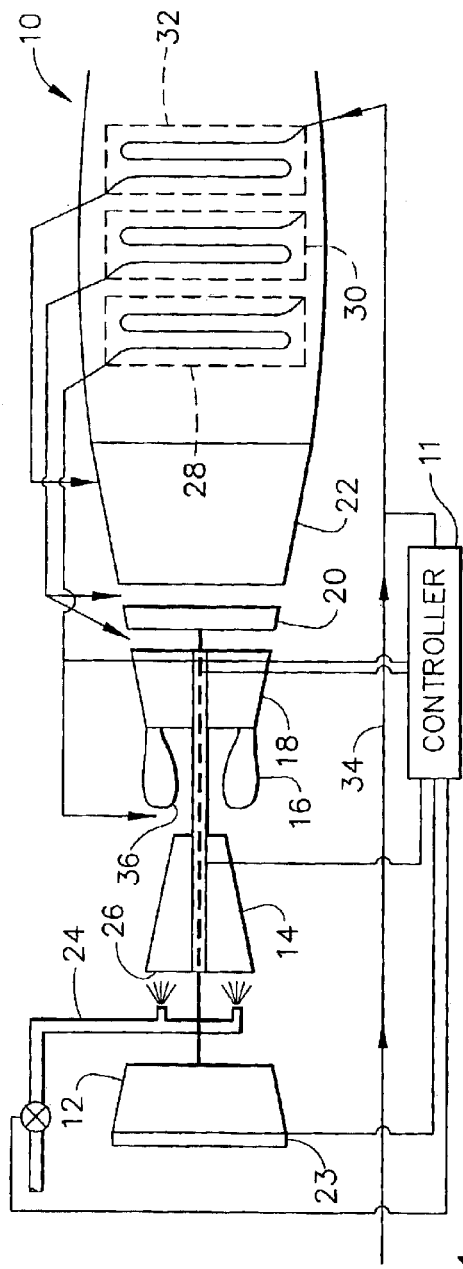
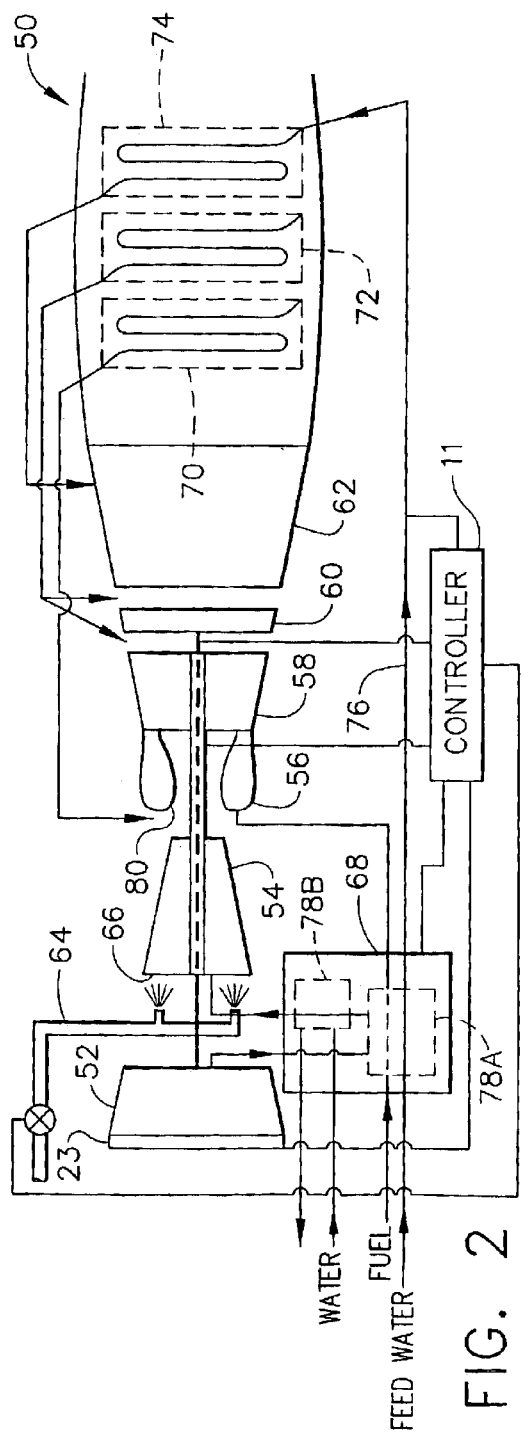
FIG. 1
FIG. 2

| NOZZLE | DROP SIZE RR (μm) | PERCENT EVAP. IN DUCT | DROP SIZE AT HP INLET RR (μm) | PERCENT DEP. ON HP INLET VANES | LOCATION OF COMPLETE EVAP. |
|---|---|---|---|---|---|
| 1. PRESS. AT. AT 3000 PSI | 23 | 28 | 22 | 88 | AT HP COMP. DISCH** |
| 2. PRESS. AT. AT 3000 PSI | 26* | 21 | 24.5 | 91 | ~7% THROUGH HP |
| 3. AIR AT. AT -22 SCFM | 14.5 | 41 | 14 | 66 | 11th STAGE OF HP |
| 4. AIR AT. AT -33 SCFM | 10.5 | 51 | 9.9 | 30 | 7th STAGE OF HP |
| 5. AIR AT. AT -45 SCFM | 7.5 | 76 | 6.5 | NEGT | 3rd STAGE OF HP |

FIG. 13

METHODS FOR OPERATING GAS TURBINE ENGINES

BACKGROUND OF THE INVENTION

This invention relates generally to gas turbine engines and more particularly, to engine control systems used with gas turbine engines that include prebooster and precompressor water injection, and variable inlet guide vanes.

Gas turbine engines typically include a compressor for compressing a working fluid, such as air. The compressed air is injected into a combustor which heats the fluid causing it to expand, and the expanded fluid is forced through a turbine. The compressor typically includes a plurality of compression stages sometimes contained in a separate low pressure compressor and a high pressure compressor.

The output of known gas turbine engines may be limited by signals received by the engine controller indicative of the speed of the rotor shafts, sometimes referred to as XN2 for the speed of the low pressure rotor, and XN25 for the speed of the high speed rotor, as well as the temperature of the working fluid at the output of the high pressure compressor, sometimes referred to as temperature "T3", and by the temperature of the working fluid in the combustor outlet, sometimes referred to as temperature "T41". The indication of the temperature at the outlet of the combustor T41 is recorded by temperature sensors at a downstream location, such as the outlet of the high pressure turbine, which is sometimes referred to as "T48". To reduce both the T3 and T41 temperatures, while maintaining a constant flow of the working fluid, at least some known engines use an intercooler positioned in the fluid flow path between the low pressure compressor and the high pressure compressor. In steady state operation, the precooler or intercooler extracts heat from the air compressed in the compressor, which effectively reduces both the temperature and volume of air exiting the high pressure compressor. Such reduction in temperature reduces both the T3 and T41 temperatures. Increased power output therefore can be achieved by increasing flow through the compressor. However, such an intercooler may also reduce thermal efficiency of the engine.

To facilitate reducing both the T3 and T41 temperatures for power augmentation, without sacrificing engine thermal efficiency, at least some known engines include prebooster or precompressor water injection. The water spray facilitates reducing both the T3 and T41 temperatures, and also reduces compressive engine horsepower. Because the T3 and T41 temperatures are reduced, the engine is not T3 and T41 constrained, the engine may operate at higher output levels below the T3 and T41 temperature limits.

To facilitate optimizing power production from the gas turbine engine, at least some known engines that include water injection also employ variable inlet guide vane (VIGV) assemblies. The VIGV assemblies include a plurality of variably positioned inlet guide vanes that when rotated, facilitate changing the geometry of the gas turbine engines engine operation to facilitate improving engine performance over a wide range of engine operations. The combination of the water injection and the VIGV assemblies reduces an effective inlet flow temperature such that the gas turbine engine may be operated with increased power before being T3 and/or T41 temperature limited.

BRIEF SUMMARY OF THE INVENTION

In one aspect, a method for operating a gas turbine engine including a high pressure compressor, a variable inlet guide vane assembly and a water injection apparatus for injecting water into a flow of the engine is provided. The method comprises transmitting engine operating parameters including a temperature of the gas flow at an outlet of the high pressure compressor, T3, to an engine controller, using the controller to regulate a flow of water injected into the gas flow and to adjust a relative position of the inlet guide vane assembly until engine full power is about reached as determined by a pre-defined T3 operating parameter limit, and adjusting the controller to then facilitate operation of the engine with an increased output without exceeding the pre-defined T3 operating parameter limit.

In another aspect of the invention, a method for operating a gas turbine engine including a variable inlet guide vane assembly is provided. The method comprises adjusting a relative position of the variable guide vane assembly based on feedback to an engine controller, injecting water into the engine gas flow at a first flow rate until engine full power is about reached as determined by the engine controller, wherein at a specific effective engine inlet temperature, engine full power is limited by a pre-defined temperature of the gas flow at an outlet of the high pressure compressor, T3, adjusting pre-defined limits within the engine controller to enable the engine to operate with a reduced effective engine inlet temperature, and re-accelerating the engine to full power without exceeding the pre-defined T3 temperature.

BRIEF DESCRIPTION OF THE DRAWINGS

FIG. 1 is an exemplary schematic illustration of a gas turbine engine including compressor water injection;

FIG. 2 is an exemplary schematic illustration of a gas turbine engine including compressor water injection and intercooling;

FIG. 13 is a chart illustrating an exemplary water schedule for increasing power output from the engine arrangement shown in FIG. 8;

DETAILED DESCRIPTION OF THE INVENTION

Figure 3:
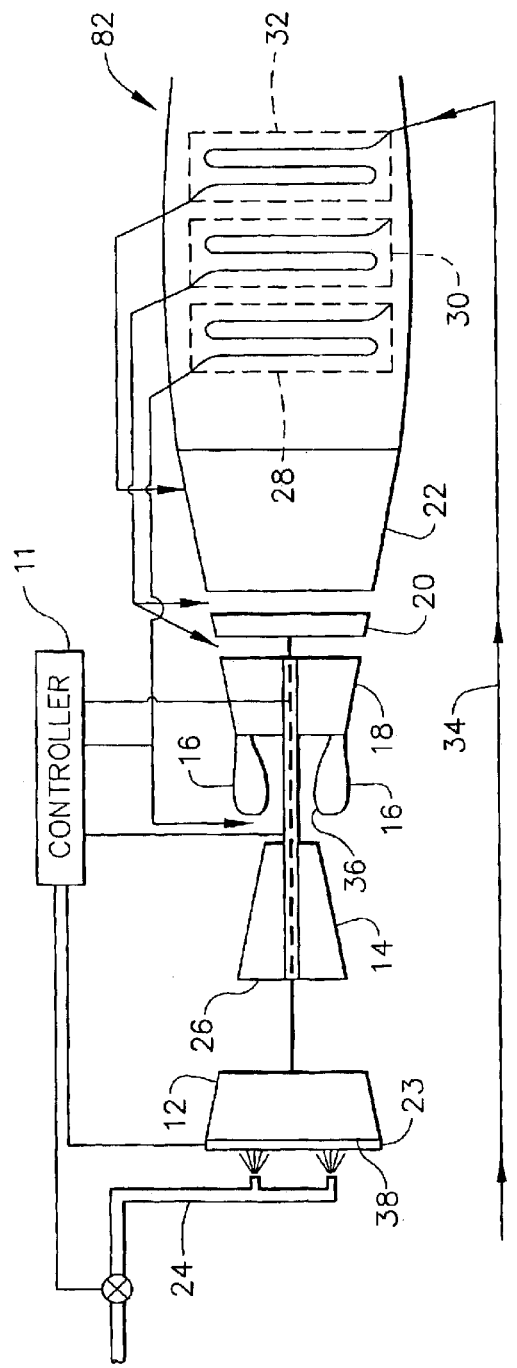
FIG. 3 is an alternative exemplary embodiment of a schematic illustration of a gas turbine engine including booster water injection.

Set forth below are exemplary configurations of turbine engines in accordance with various embodiments of the present invention. Initially, it should be understood that although specific implementations are illustrated and described, engine components of each embodiment can be practiced using many alternative structures and in a wide variety of engines. For example, and as described below in more detail, water spray injection can be performed at the inlet of a high pressure compressor, at an inlet of the booster, or at both locations.

FIG. 1 is a schematic illustration of a gas turbine engine 10 which, as is well known, includes a controller 11, a low pressure compressor 12, a high pressure compressor 14, and a combustor 16. Engine 10 also includes a high pressure turbine 18, a low pressure turbine 20, a power turbine 22, and a variable inlet guide vane assembly (VIGV) 23. Engine 10 also includes a water injection apparatus 24 for injecting water into an inlet 26 of high pressure compressor 14. Further details regarding water injection apparatus 22 are set forth below. For purposes of FIG. 1, however, it should be understood that apparatus 24 is in flow communication with a water supply (not shown) and water is delivered from the supply through apparatus 24 to compressor inlet 26. Additionally, it should be understood that the operation of apparatus 24 is regulated by controller 11. Apparatus 24 is air aspirated using a bleed source off compressor 14 to provide a finer spray mist. Waste heat boilers 28, 30, and 32 are located downstream of power turbine 22. As is known in the art, feed water is supplied to boilers 28, 30, and 32 via a feedwater line 34, and water in the form of steam is communicated from boilers 28, 30, and 32 to various upstream components. More specifically, steam from boiler 28 is provided to an inlet 36 of combustor 16, steam from boiler 30 is provided to an inlet of low pressure turbine 20 and an inlet of power turbine 22, and steam from boiler 32 is provided to a last stage of power turbine 22.

Variable inlet guide vane assembly 23 is known in the art and channels airflow entering turbine engine 10 downstream into the core engine. VIGV assembly 23 extends substantially circumferentially within engine 10 and includes a plurality of variable flaps (not shown) that are positionable during engine operation to facilitate improving engine performance over a wide range of engine operations. More specifically, as engine 10 is operated at design operating conditions, the flaps are generally axially aligned with respect to engine 10. An orientation of the flaps is controlled by controller 11 based on the conditions at which the engine is operated.

In addition to receiving the T3 and T41 temperatures, controller 11 receives a plurality of different engine operating parameters from a plurality of sensors coupled to engine 10. For example, controller 11 receives values indicative of the core engine shaft speed, the engine inlet airflow, and the water flow injection rate. In one embodiment, controller 11 is a Mark VI Speedtronic™ Controller commercially available from General Electric Power Systems, Schenectady N.Y. Controller 11 is a processor-based system that includes engine control software that configures controller 11 to perform the below-described processes. As used herein, the term processor is not limited to just those integrated circuits referred to in the art as processors, but broadly refers to computers, processors, microcontrollers, microcomputers, programmable logic controllers, application specific integrated circuits, and other programmable circuits.

FIG. 2 is a schematic illustration of another embodiment of a gas turbine engine 50 including water spray injection, controller 11, and variable inlet guide vane assembly 23. Engine 50 includes a low pressure compressor or booster 52, a high pressure compressor 54, and a combustor 56. Engine 50 also includes a high pressure turbine 58, a lower pressure turbine 60, and a power turbine 62. Engine 50 further includes a water injection apparatus 64 for injecting water into an inlet 66 of high pressure compressor 54. For purposes of FIG. 2, it should be understood that apparatus 64 is in flow communication with a water supply (not shown) and water is delivered from such supply through apparatus 64 to inlet 66 of compressor 54. An intercooler 68 also is positioned in series flow relationship with booster 52 to receive at least a portion or all of the air flow output by booster 52, and the output of intercooler 68 is coupled to inlet 66 of compressor 54. Of course, cooling water is supplied to intercooler 68 as illustrated or blower fans could be used for air cooling. Intercooler 68 could, for example, be one of the intercoolers described in U.S. Pat. No. 4,949,544.

Waste heat boilers 70, 72, and 74 are located downstream of power turbine 62. As is known in the art, feed water is supplied to boilers 70, 72, and 74 via a feedwater line 76 which extends through a first stage 78A of intercooler 68, and steam is communicated from boilers 70, 72, and 74 to various upstream components. Particularly, steam from boiler 70 is provided to an inlet 80 of combustor 56, steam from boiler 72 is provided to an inlet of low pressure turbine 60 and an inlet of power turbine 62, and steam from boiler 74 is provided to a last stage of power turbine 62.

Although not shown in the exemplary configuration set forth in FIG. 2, it is contemplated that rather than, or in addition to, water spray injection at inlet 66 of high pressure compressor 54, such injection can be performed at the inlet of low pressure compressor, or booster, 52 (booster water spray injection is illustrated in FIG. 3).

An exemplary configuration of an engine 82 including booster water spray injection, controller 11, and variable inlet guide vane assembly 23 is set forth in FIG. 3. The configuration of engine 82 is substantially similar to engine 10 shown in FIG. 1 with the exception that water spray injection apparatus 24 is located at an inlet 38 of low pressure compressor, or booster, 12. In engine 82, water is injected into booster 12 and cools the air flowing through booster 12.

Figure 4:
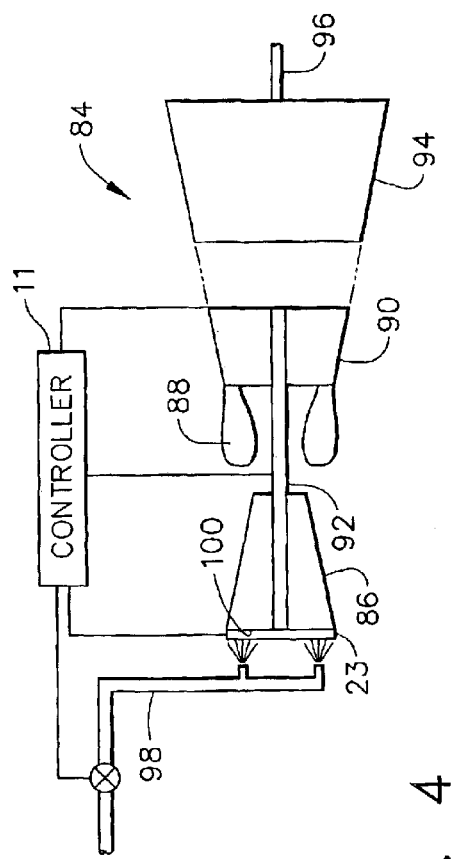
FIG. 4 is another alternative exemplary embodiment of a schematic illustration of a single rotor gas turbine engine including compressor water injection.

FIG. 4 is an exemplary schematic illustration of a single rotor gas turbine engine 84 including compressor water injection, controller 11, and variable inlet guide vane assembly 23. Engine 84 includes a high pressure compressor 86, a combustor 88, and a high pressure turbine 90. A shaft 92 coupled high pressure compressor 86 and high pressure turbine 90. A power turbine 94 is downstream from high pressure turbine 90, and a shaft 96 is coupled to and extends from power turbine 94. Water spray injection apparatus 98 is located at an inlet 100 of high pressure compressor 86.

Figure 5:
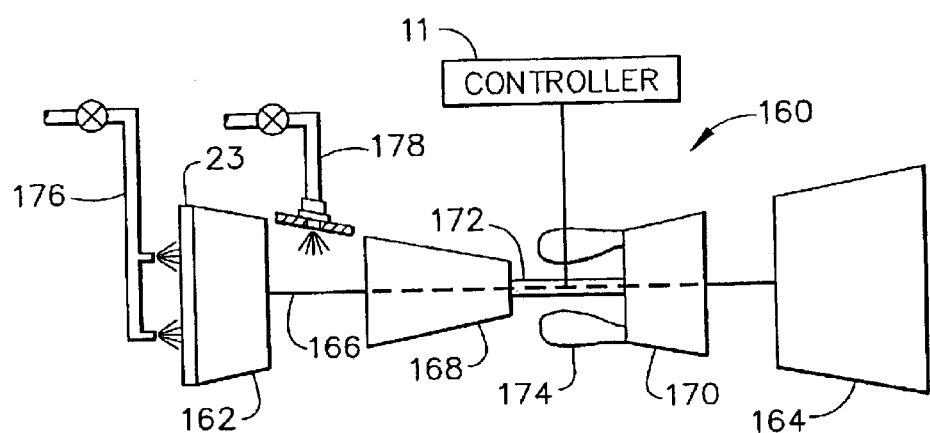
FIG. 5 is another alternative exemplary embodiment of a schematic illustration of a gas turbine engine including booster and compressor water injection.

A dual rotor gas turbine engine 10 is shown schematically in FIG. 5. Engine 160 includes a booster 162 and a power turbine 164 connected by a first shaft 166, a high pressure compressor 168 and a high pressure turbine 170 connected by a second shaft 172, and a combustor 174. Engine 160 also includes pre-booster water spray injection apparatus 176, pre-compressor water spray injection apparatus 178, controller 11, and variable inlet guide vane assembly 23.

Figure 6:
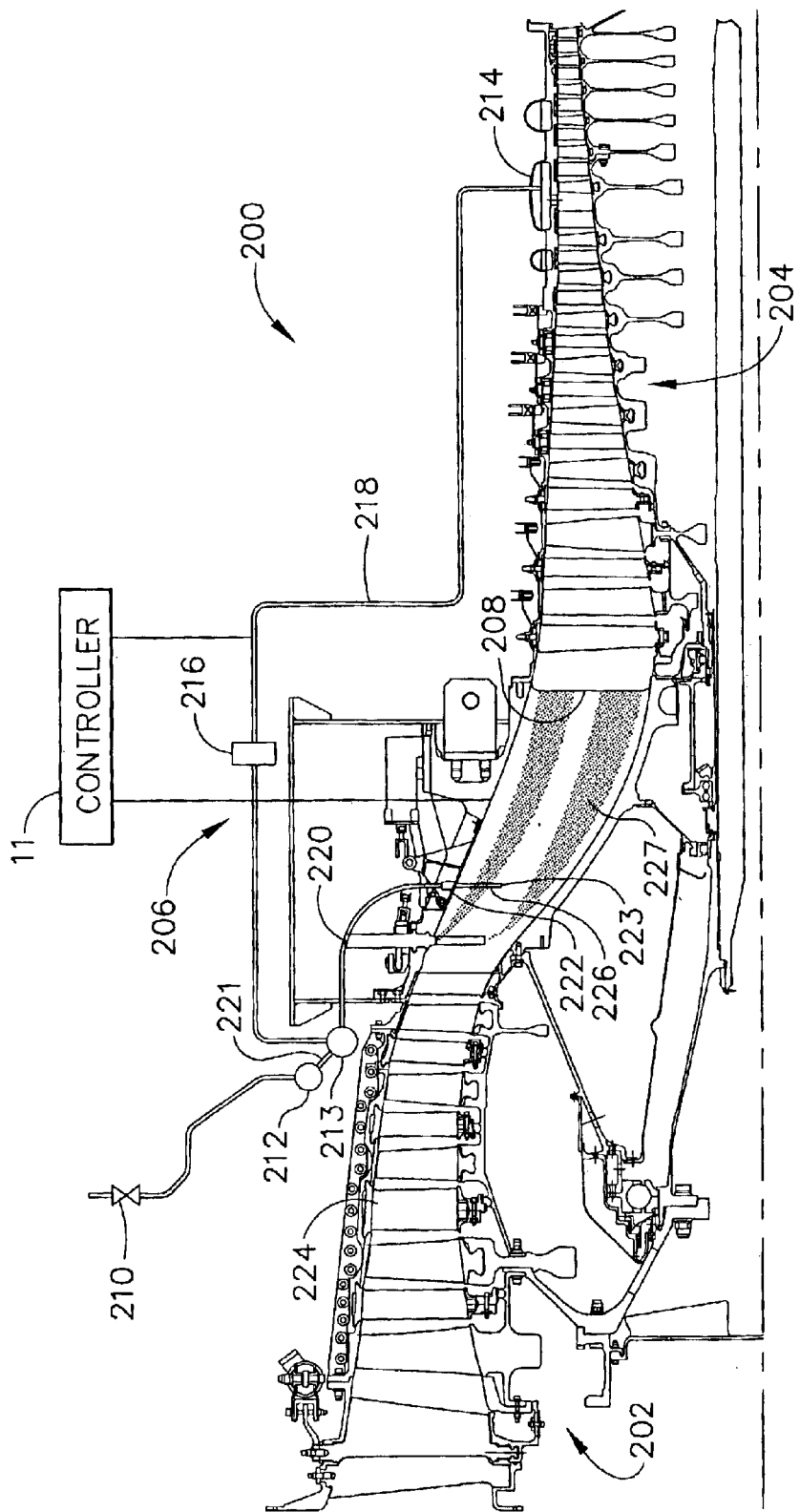
FIG. 6 is is another alternative exemplary embodiment of a schematic illustration of a gas turbine engine including compressor water injection.

FIG. 6 is an exemplary schematic illustration of a gas turbine engine 200 including compressor water injection, controller 11, and variable inlet guide vane assembly 23 (not shown in FIG. 6). Engine 200 includes a low pressure compressor 202 and a high pressure compressor 204. In this embodiment, low pressure compressor 202 is a five stage compressor, and high pressure compressor 204 is a fourteen stage compressor. A combustor (not shown) is downstream from compressor 204. Engine 200 also includes a high pressure turbine (not shown) and a low pressure turbine (not shown). The high pressure turbine is a two stage turbine, and the low pressure turbine is a five stage turbine.

Engine 200 also includes a water injection apparatus 206 for injecting water into an inlet 208 of high pressure compressor 204. Water injection apparatus 206 is controlled by controller 11 and includes a water metering valve 210 in flow communication with a water manifold 212. Water is supplied to metering valve 210 from a water source or reservoir. Air is supplied to an air manifold 213 from an eight stage bleed 214 of high pressure compressor 204. Bleed 214 serves as a source of heated air. A heat exchanger 216 is coupled to flow pipe or tube 218 which extends from eight stage bleed 214 to air manifold 213. Feeder tubes 220 and 221 extend from air manifold 213 and water manifold 212 to twenty four spray nozzles 222 and 223 radially spaced and extending through outer casing 224. Nozzles 222 are sometimes referred to herein as short nozzles 222, and nozzles 223 are sometimes referred to herein as long nozzles 223. Nozzles 222 and 223 are radially spaced around the circumference of casing 224 in an alternating arrangement as described below in more detail.

Twenty four water feeder tubes 221 extend from water manifold 212, and twenty four air feeder tubes 220 extend from air manifold 213. Each nozzle 222 is coupled to one water feeder tube 221 from water manifold 212 and to one air feeder tube 220 from air manifold 213. Generally, water flowing to each nozzle 222 and 223 is atomized using the high pressure air (e.g., at about 150 psi) taken off eight stage bleed 214 of high pressure compressor 204. The droplet diameter, in this embodiment, should be maintained at about 20 microns. Such droplet diameter is maintained by controlling the rate of flow of water through valve 210 using the water schedule described below in more detail and utilizing the high pressure air from bleed 214.

The above described water injection apparatus 206 may also be utilized in connection with pre-low pressure compressor water spray injection. For example, water injection apparatus 206 may also be utilized with engine 10 (shown in FIG. 1), engine 50 (shown in FIG. 2), engine 82 (shown in FIG. 3), engine 84 (shown in FIG. 4), or engine 160 (shown in FIG. 5). It is believed that such pre-low pressure compressor water spray injection provides at least many of the same advantages as the intermediate, or pre-high pressure compressor described in more detail below.

Figure 7:
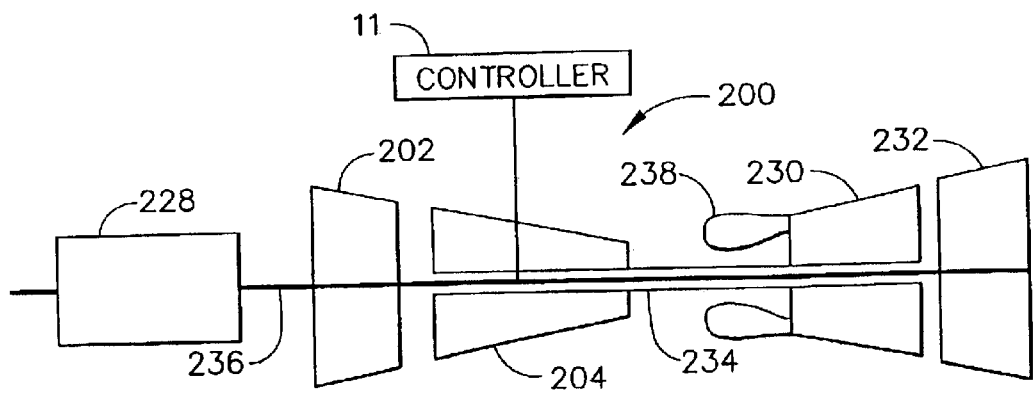
FIG. 7 is an exemplary schematic illustration of the gas turbine engine shown in FIG. 6 coupled to an electric generator.
Figure 10:
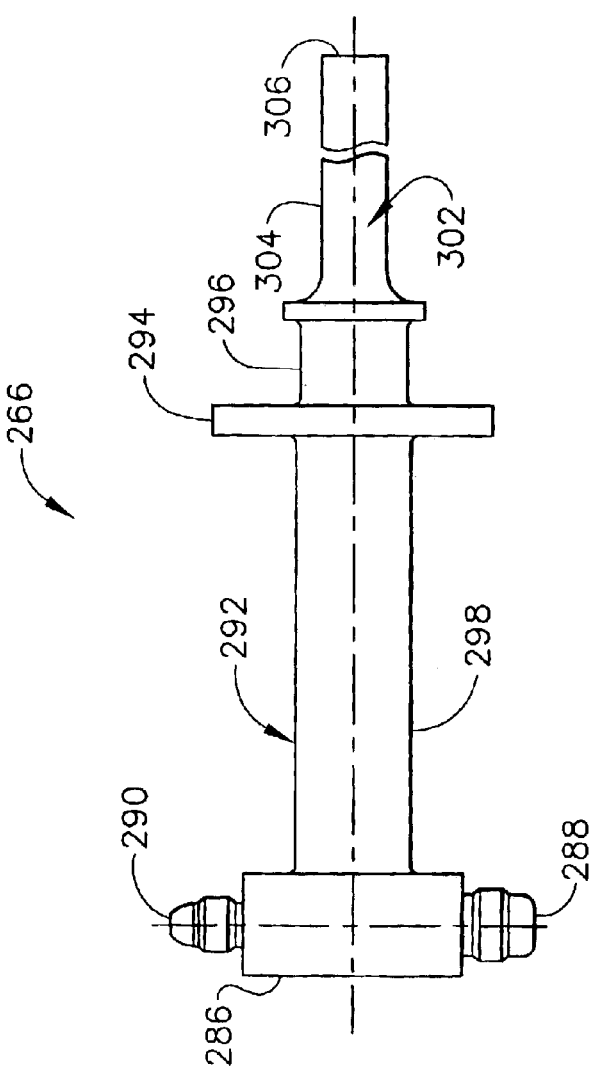
FIG. 10 is a side view of an exemplary embodiment of a nozzle that may be used with any of the water injection systems illustrated.

FIG. 7 is a schematic illustration of gas turbine engine 200 coupled to an electric generator 228. As shown in FIG. 10, engine 200 includes a high pressure turbine 230 and a low pressure turbine 232 downstream from high pressure compressor 204. High pressure compressor 204 and high pressure turbine 230 are coupled via a first shaft 234, and low pressure compressor 202 and low pressure turbine are coupled via a second shaft 236. Second shaft 236 also is coupled to generator 228. A combustor 238 is between compressor 204 and turbine 230. Engine 200 may be, for example, an LM6000 Gas Turbine Engine commercially available from General Electric Company, Cincinnati, Ohio.

Rather than being originally manufactured to include injection apparatus 206, it is possible that apparatus 206 is retrofitted into existing engines. Injection apparatus 206 would be provided in kit form and include tubing 218 and 220, along with water and air manifolds 212 and 213 and water metering valve 210. Nozzles 222 and 223 also would be provided. When it is desired to provide water spray injection, nozzles 222 and 223 are installed in outer casing 224 and flow tube 218 is installed and extends from eighth stage bleed 214 to air manifold 213. Valve 210 is coupled between a water source and water manifold 212, and water manifold 212 is coupled to air manifold 213.

Figure 8:
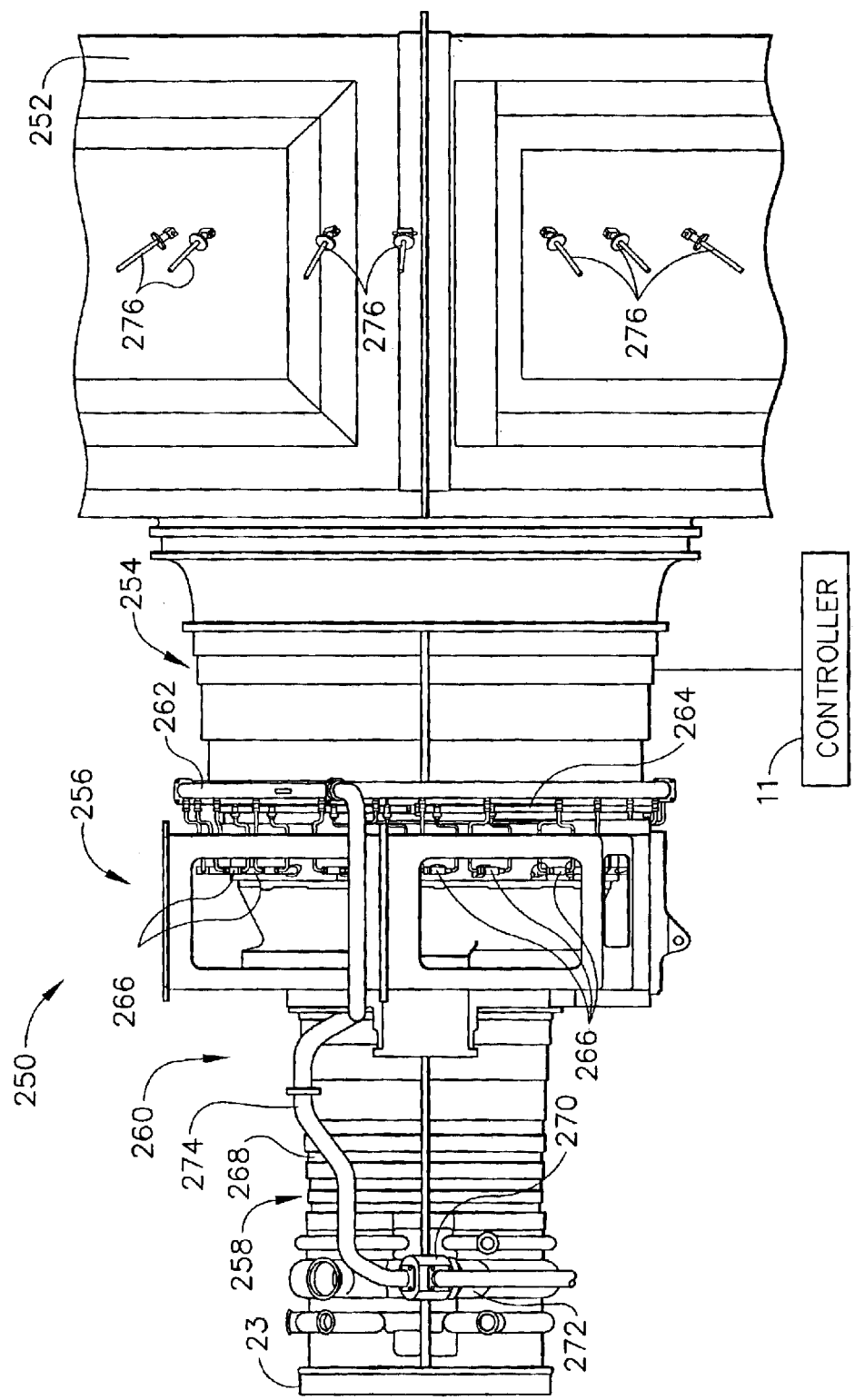
FIG. 8 is a side view of an LM6000 engine of General Electric Company modified to include spray injection.

FIG. 8 is a side view of an LM6000 engine 250 of General Electric Company including a controller 11 and a variable inlet guide vane assembly 23. Engine 250 includes an inlet 252, a low pressure compressor 254, and front frame 256, and a high pressure compressor 258. Engine 250 is modified to include water spray injection apparatus 260, which includes an air manifold 262 and a water manifold 264 coupled to twenty four radially spaced nozzles 266 mounted to an engine outer casing 268. Nozzles 266 spray water into engine 250 at a location between low pressure compressor 254 and high pressure compressor 258. Injection apparatus 260 also includes a connector 270 for connecting to an eight stage bleed 272 of high pressure compressor 258, and a pipe 274 extending from connector 270 to air manifold 262. Although not shown in FIG. 8, a heat exchanger (air to air or water to air) may be coupled to pipe 274 to reduce the temperature of the air supplied to air manifold 262. For illustration purposes, nozzles 276 are shown secured to inlet 252 of low pressure compressor 254. Air and water manifolds also could be coupled to nozzles 276 to provide pre-low pressure compressor water spray injection. The components of injection apparatus 260 described above are fabricated from stainless steel.

High pressure compressor 258 includes stator vanes which typically are not grounded to case 268. When used in combination with water spray injection, it has been found that grounding at least some of such vanes which come into contact with the water spray may be necessary. To the extent required, and using for example, graphite grease, such vanes can be grounded to case 268. That is, graphite grease may be applied to the bearing area of such vanes. For example, such graphite grease can be used at the inlet guide vane and for each down stream vane through the second stage. In operation, a portion of the grease heats and dissipates, and the graphite remains to provide a conductive path from the vane to case 268.

It also should be understood if the water can be supplied to the water spray injection nozzles under sufficient pressure, it may not be necessary to supply high pressure air to nozzles. Therefore, it is contemplated that the eight stage bleed could be eliminated if such high pressure water is available.

Figure 9:
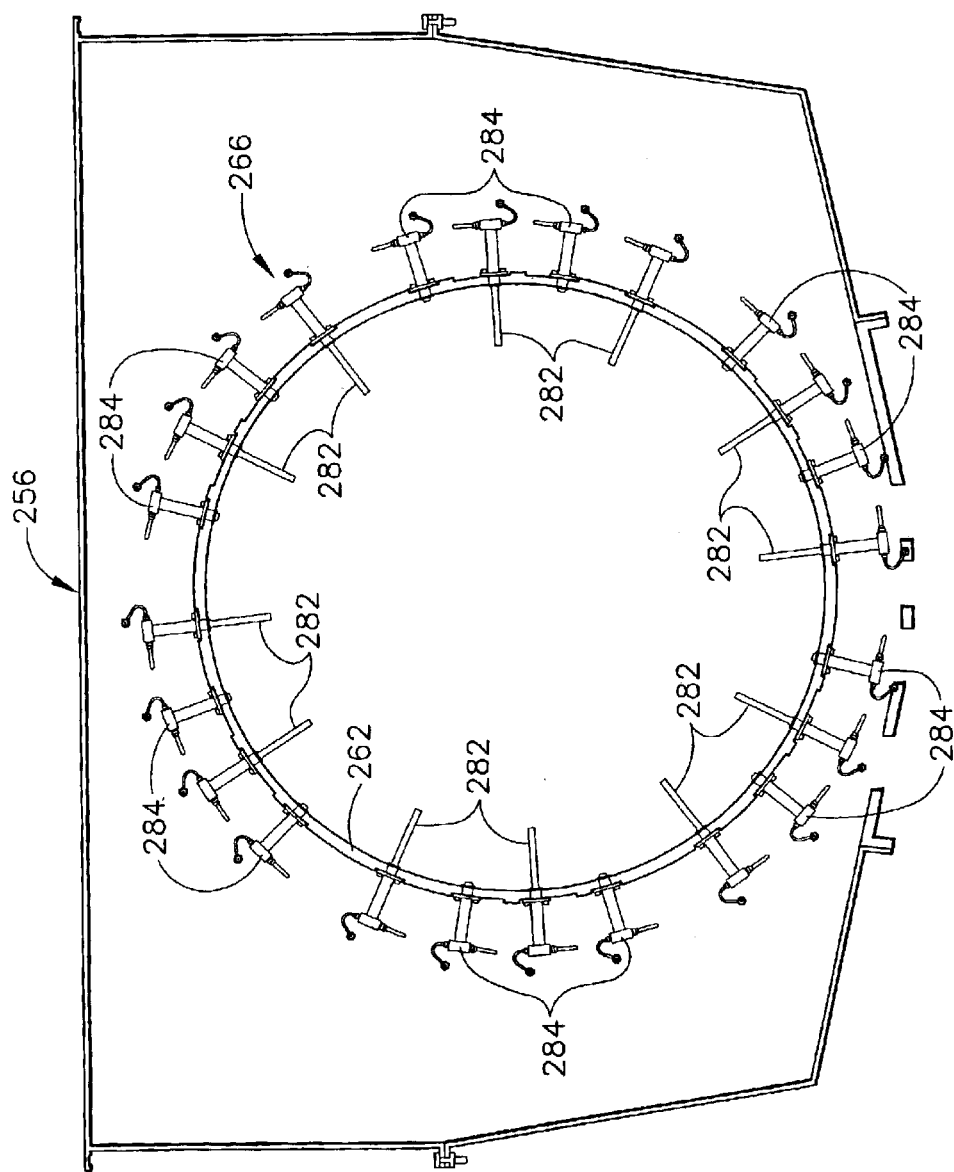
FIG. 9 is a cross sectional view of the engine shown in FIG. 8 and illustrating a nozzle configuration.

FIG. 9 is a cross sectional view of engine 250 and illustrating nozzles 266. Nozzles 266 are configured so that water injected into the gas flow to high pressure compressor 258 provides substantially uniform radial and circumferential temperature reductions at the outlet of high pressure compressor 258. Nozzles 266 include a set 282 of long nozzles and a set 284 of short nozzles. In the configuration shown in FIG. 10, at least one short nozzle 284 is located at a radially intermediate location between two radially aligned long nozzles 282. Short nozzles 284 are about flush with the circumference of the flow path and long nozzles 282 extend about four inches into the flow path. Of course, other lengths nozzles may be utilized depending upon the desired operation results. In one specific implementation, nozzle 284 extends about 0.436 inches into the flow path, and nozzle 282 extends 3.686 inches into the flow path. The water ratio between short nozzles 284 and long nozzles 282 (e.g., 50/50) may also be selected to control the resulting coding at the compressor outlet.

The temperature sensor for obtaining the temperature at the inlet of the high pressure compressor (i.e., temperature T25), is aligned with a long nozzle 282. By aligning such temperature sensor with a long nozzle 282, a more accurate temperature measurement is obtained rather than having such sensor aligned with a short nozzle 284.

Figure 11:
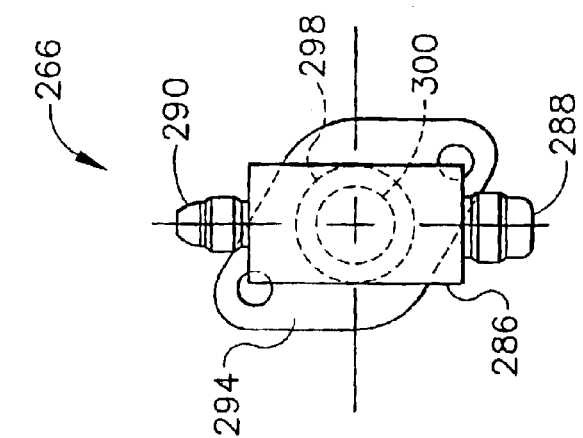
FIG. 11 is a top view of the nozzle shown in FIG. 11.

FIGS. 10 and 11 illustrate one of nozzles 266. Long and short nozzles 282 and 284 differ only in length. Nozzle 266 includes a head 286 having an air nozzle 288 and a water nozzle 290. Air nozzle 288 couples to an air pipe (not shown) which extends from nozzle 288 to air manifold 262. Water nozzle 290 couples to a water pipe (not shown) which extends from nozzle 290 to water manifold 264. Nozzle 266 also includes a stem 292 and a mounting flange 294 for mounting nozzle 266 to case 262. A mounting portion 296 of stem 292 facilitates engagement of nozzle 266 to case 262.

Stem 292 is formed by an outer tubular conduit 298 and an inner tubular conduit 300 located within conduit 298. Air flows into nozzle 288 and through the annulus between outer conduit 298 and inner conduit 300. Water flows into nozzle 290 and through inner conduit 300. Mixing of the air and water occurs in stem portion 302 formed by a single conduit 304. An end 306 of nozzle 266 is open so that the water and air mixture can flow out from such end 306 and into the flow path.

Figure 12A:
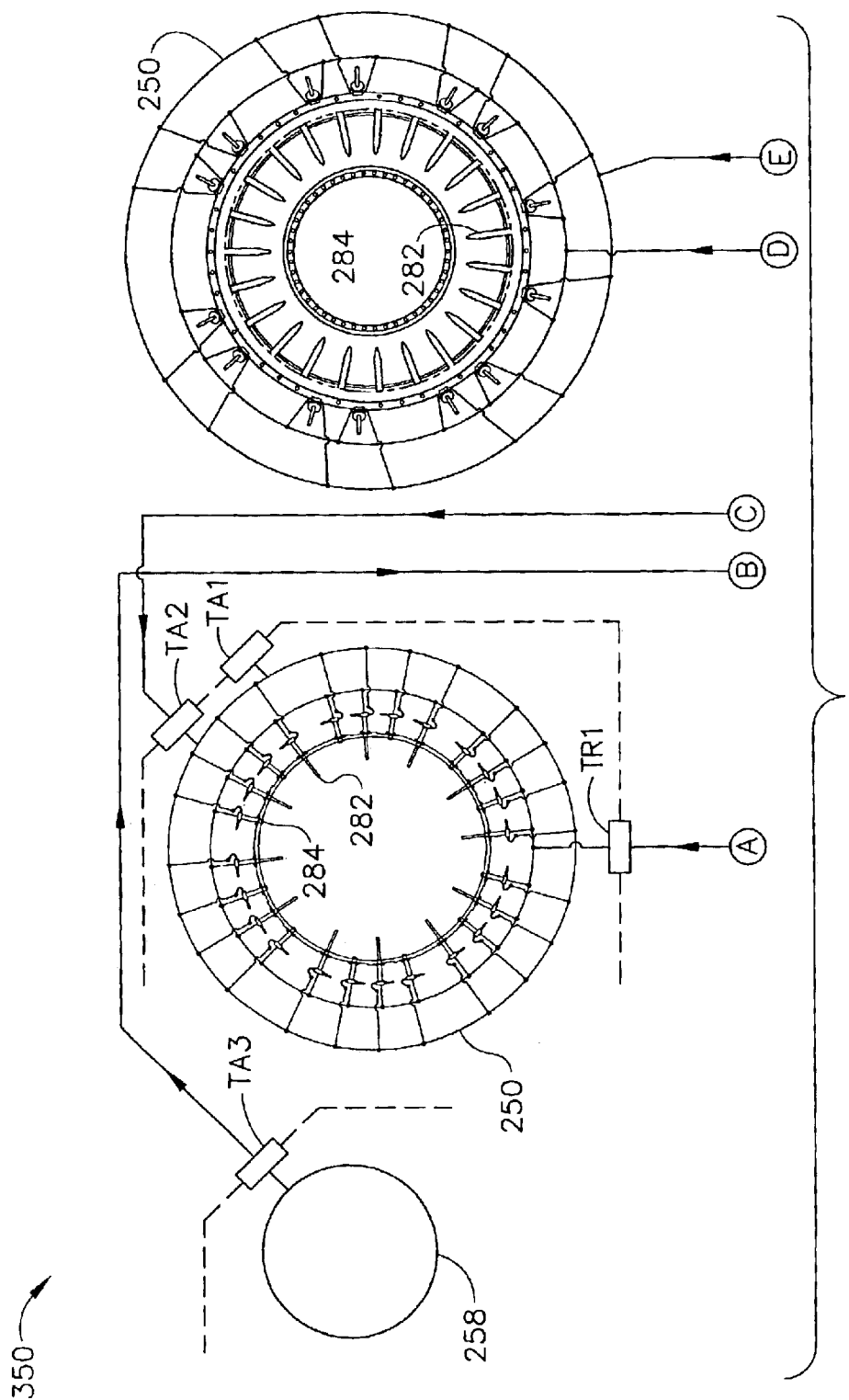
FIG. 12 is an exemplary schematic diagram of a control circuit for controlling the supply of water and air to the nozzles in the engine shown in FIG. 8.
Figure 12B:
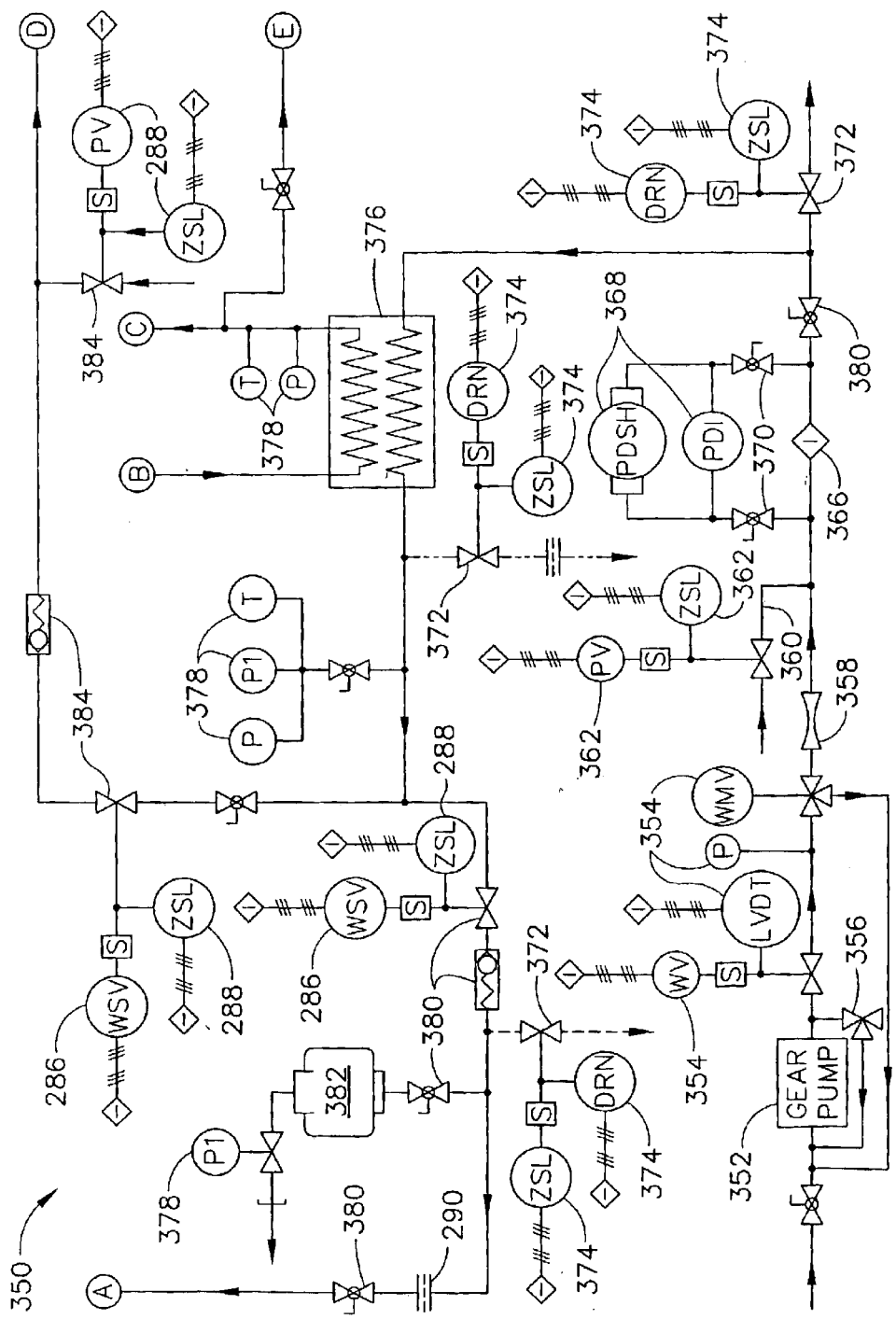

FIG. 12 is a schematic diagram of a control circuit 350 for controlling the supply of water and air to nozzles 282 and 284 in engine 250 for both frame water injection (aft looking forward) and inlet water injection (aft looking forward). Control circuit 350 is implemented by controller 11. As shown in FIG. 12, demineralized water is pumped through a motor driven water pump 352. Sensors 354 are coupled to the water delivery line such as a linear variable differential transformer, a pressure sensor, and a water meter valve. A relief valve 356 is connected in parallel with pump 352, and a flow meter 358 is coupled in series with pump 352. An air purge line 360 also is coupled to the water delivery line. Controls 362 for a normally closed solenoid valve control 364 air purge operations. A filter 366 also is provided in the water delivery line, and sensors 368 with valves 370 (manual hand valve-locking flag feature (normally open)) are coupled in parallel with filter 366.

Normally open valves 372, coupled to controls 374, are provided to enable water to drain from the water delivery line into a water drain system. Water in the water delivery line flows through a heat exchanger 376 which receives air from the eight stage bleed of high pressure compressor 258.

For frame water injection, multiple sensors 378 and control valves 380 control the supply of water to nozzles 282 and 284. Circuit 350 also includes a water accumulator 382. For inlet water injection, sensors 378 and control valve 384 control the supply of water to nozzles 282.

Letter designations in FIG. 12 have the following meanings.

T—temperature measurement location
P—pressure measurement location
PI—pressure indicator
N/C—normally closed
N/O—normally open
PDSW—pressure differential switch
PDI—pressure differential indicator
DRN—drain
ZS—position switch
WMV—water metering valve
PRG—purge
LVDT—linear variable differential transformer In FIG. 13, a solid line is a water supply line, a double dash line is a drain line, and a solid line with hash marks is an electrical line. Boxes identify interfaces between the water supply system and the engine. Water metering valves 286 and other control/measurement valves 288, and an orifice 290 (for inlet water injection) are utilized in connection with the control of water flow through circuit 350.

FIG. 13 is a chart illustrating an exemplary water schedule for power augmentation of engine 250. The amount of water supplied to the nozzles for power augmentation varies depending, for example, on the ambient temperature as well as the size of the desired droplets. Accordingly, amount of percent increase of water supplied to the nozzles for evaporative cooling also varies. A droplet size of 20 microns has been found, in at least one application, to provide the acceptable results. Of course, the operating parameters of the engine in which water spray injection is utilized, the desired operating parameters, and other factors known to those skilled in the art affect the amount of water spray injection.

Figure 14:
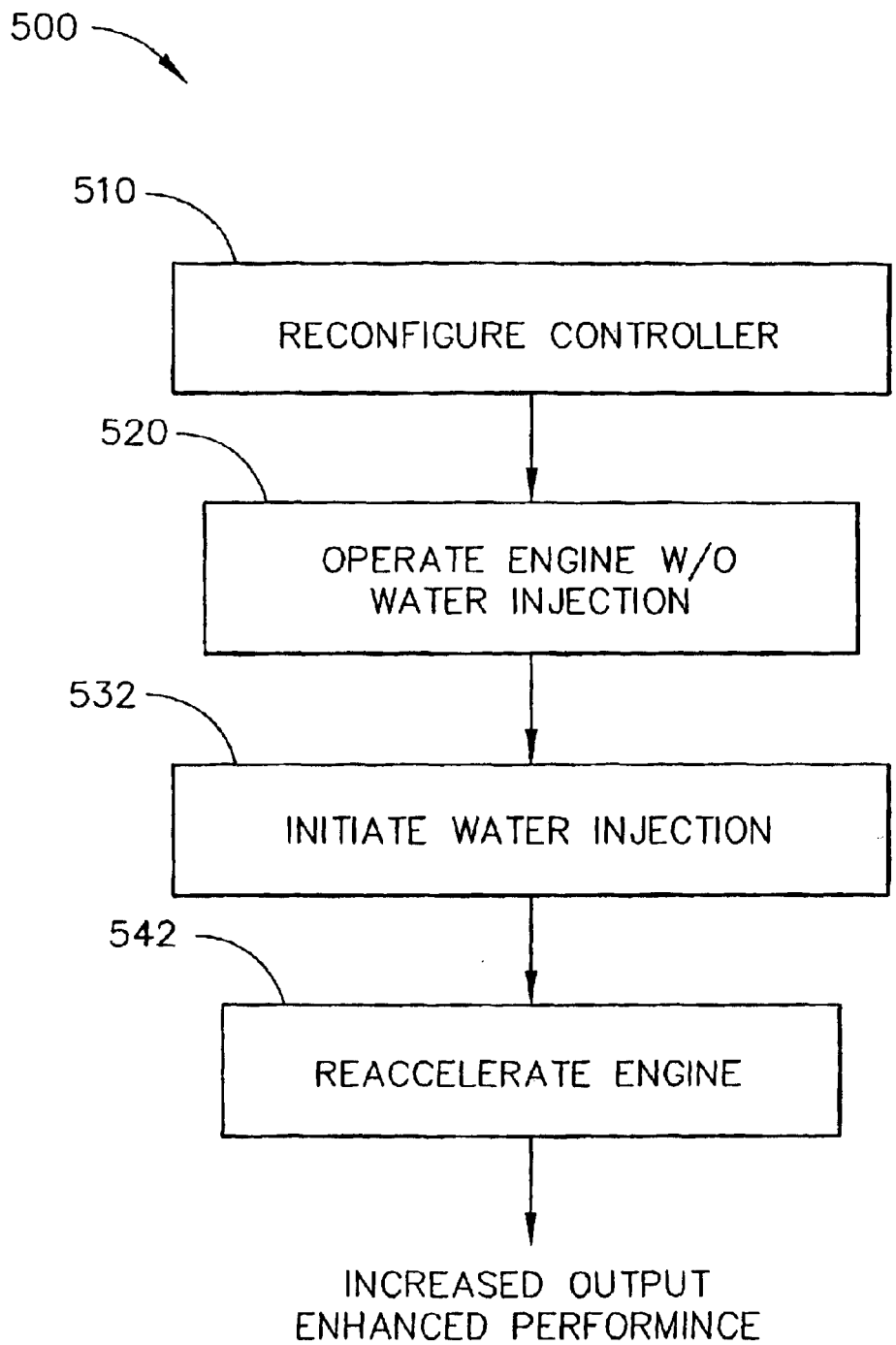
FIG. 14 is a flow chart illustrating an exemplary method for operating any of the gas turbine engines shown in FIGS. 1–8.
Figure 15:
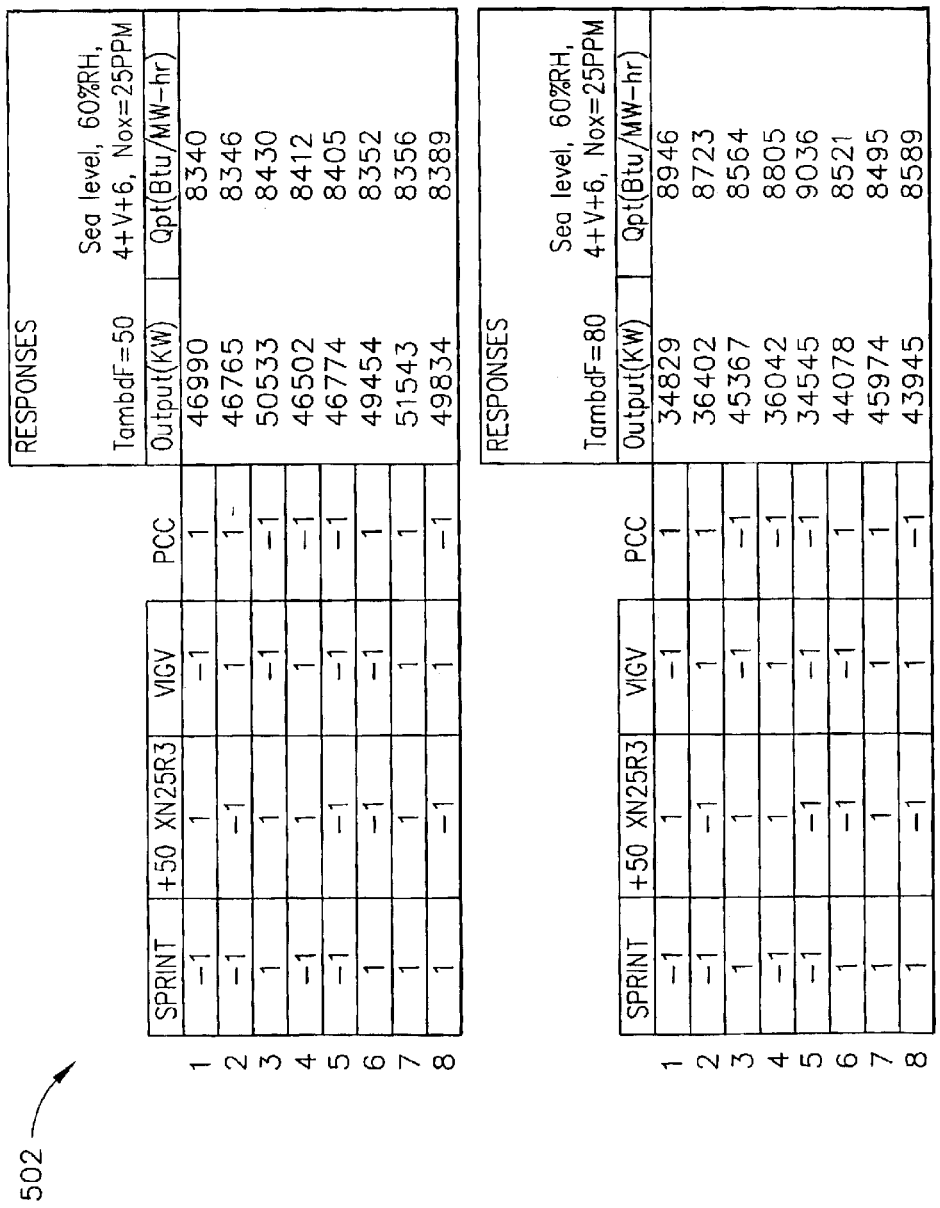
FIG. 15 is a table illustrating exemplary engine model predictions and results obtained using the method shown in FIG. 14.
Figure 16:
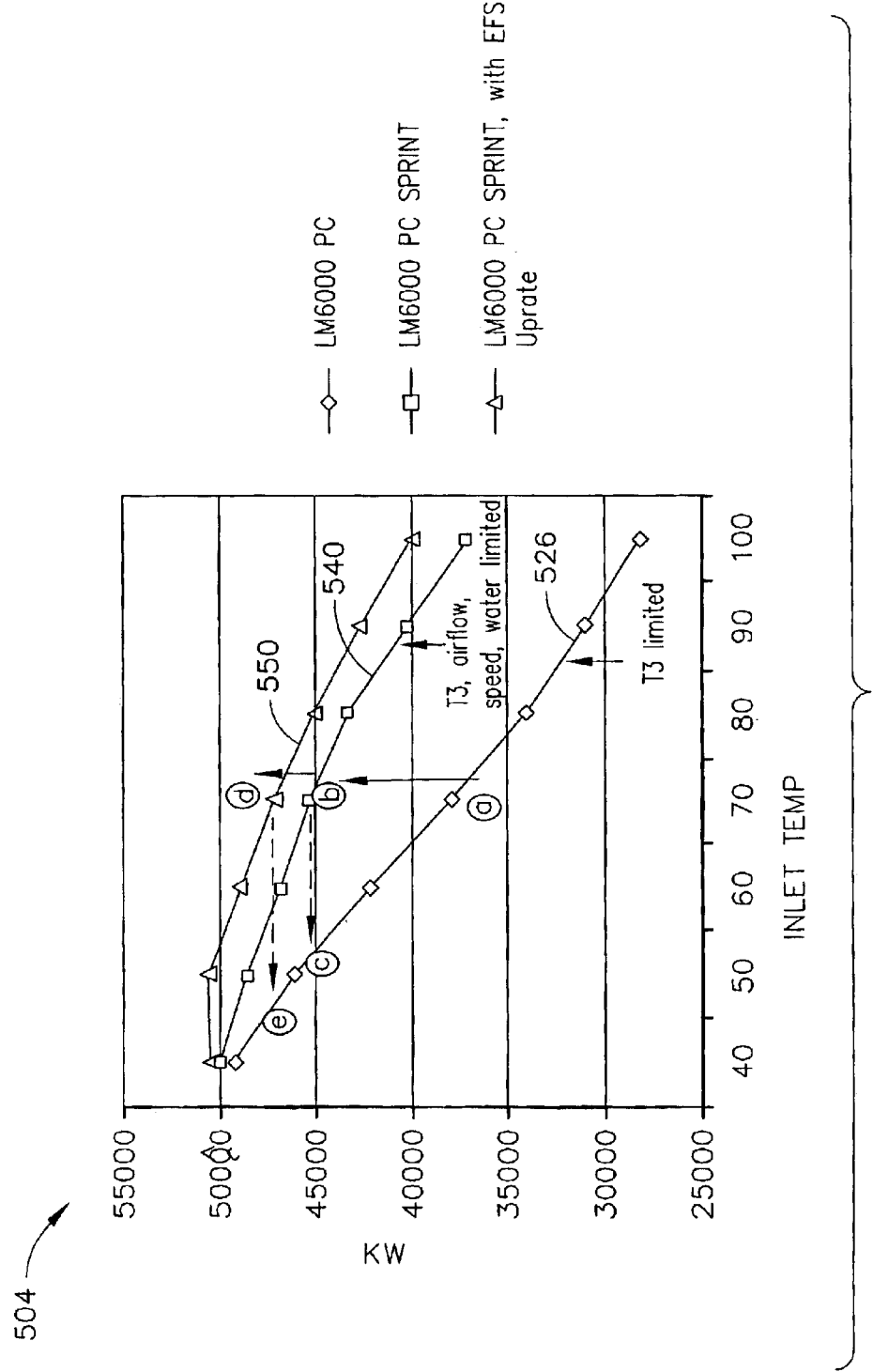
FIG. 16 is a chart illustrating exemplary power curve results generated using the method shown in FIG. 14.

FIG. 14 is a flow chart 500 illustrating an exemplary method for operating a gas turbine engine, such as any of engines 10, 50, 82, 84, 160, 200, or 250 (shown above in FIGS. 1–8). FIG. 15 is a table 502 illustrating exemplary test results obtained using the method illustrated in FIG. 14. FIG. 16 is a chart 504 illustrating exemplary power curve results generated using the method shown in FIG. 14. Specifically, flow chart 500 illustrates an exemplary method that may be employed on any gas turbine engine that includes water injection system, such as apparatus 24 (shown in FIG. 1), an engine controller, such as controller 11 (shown in FIG. 1) and a variable inlet guide vane (VIGV) assembly, such as assembly 23 (shown in FIG. 1). More specifically, the exemplary results illustrated in FIGS. 15 and 16 were obtained following engine cycle model predictions and engine testing on an LM6000 PC SPRINT™ Gas Turbine Engine commercially available from General Electric Company, Cincinnati, Ohio, and modified to include a VIGV assembly.

Initially, before the engine is operated, the engine controller is reconfigured 510 to facilitate changing specific turbine operational parameters. Reconfiguring 510 the engine controller facilitates optimizing gas turbine output and efficiency. Specifically, controller adjustments for parameters representing corrected core engine shaft speed, XN25R3, injected inter-cooling water flow, and engine inlet air flow are reconfigured 510. More specifically, the modifications to core engine shaft speed facilitate enabling a nominal speed increase of up to approximately two percent based on the inlet temperature during engine operation, and the modifications to injected inter-cooling water flow facilitate enabling a nominal flow rate increase of up to approximately two hundred percent based on the inlet temperature during engine operation. Furthermore, altering the operational schedule for the VIGV assembly to respond in light of the aforementioned engine control software changes, facilitates enabling a nominal air flow increase of approximately two percent based on the inlet temperature during engine operation.

In particular, these operating parameters are influenced by the application of turbine variable inlet geometry and as shown in the exemplary test results, operating an engine using these engine control software changes in combination with the VIGV assembly facilitates enhanced engine efficiency and performance. More specifically, as described in more detail below, the engine cycle model predictions, shown in FIG. 15, also have shown an approximate four percent increased gas output and a gas turbine efficiency (heat rate) improvement of approximately one-half percent. The exemplary results were obtainable over a normal ambient operating range.

During operation, the engine is initially operated 520 to its maximum power output without spray injection. A working fluid, such as air, is compressed while flowing through a low pressure compressor, and compressed air is supplied from the low pressure compressor to a high pressure compressor. The output of the gas turbine engine is limited by signals received by the engine controller indicative of a temperature T3 of the working fluid at the output of the high pressure compressor. When a predefined T3 temperature limit is reached, engine maximum power output is achieved based on the predefined T3 temperature limit for a specific inlet temperature. This is illustrated in FIG. 16 using power curve 526. For example, with the engine operating with an inlet temperature of approximately 70° F. (point a in FIG. 16), the engine produces an output of approximately 37.9 MW, when limited by the compressor discharge temperature T3.

Once maximum power output is achieved, water injection apparatus is initiated 532 and water is injected into the engine. Due to the higher temperature environment at the location at which the water spray is injected, the water spray partially evaporates before entering the high pressure compressor. The water spray cools the air flow in the high pressure compressor for at least each stage of the compressor through which such spray flows, i.e., until it evaporates. Usually by the sixth stage of the compressor, the water spray is evaporated. The air is further compressed by the high pressure compressor, and highly compressed air is delivered to the combustor. Airflow from the combustor drives the high pressure turbine and the low pressure turbine.

The water particles from the water spray apparatus provide the advantage that the temperature of the airflow at the outlet of the high pressure compressor (temperature T3) and the temperature of the airflow at the outlet of the combustor (temperature T41) are reduced as compared to such temperatures without the spray. Specifically, the water spray extracts heat from the hot air flowing into and through the compressor, and by extracting such heat from the air flow, the T3 and T41 temperatures are reduced along with the required compressor power.

More specifically, the water injection has the effect of reducing the compressor outlet temperature T3, such that in effect, the turbine is operated as if it were at a lower inlet temperature. This is illustrated in FIG. 16. Starting from power curve 526, at point (a) and injecting water, the engine power is then increased 542 as the T3 temperature remains the limiting control parameter, until it reaches point (b) on power curve 540. This power level illustrated on power curve 540, is substantially the equivalent of power settings available at point (c) on original power curve 526. For example, with the engine operating with an inlet temperature of approximately 70° F. and 37.9 MW point (a), after water injection is applied and the engine is re-accelerated 542, the engine produces a power output of approximately 45.2 MW at point (b), when limited by the same predefined compressor discharge temperature T3 limit. This is substantially equivalent to operating on power curve 526 at point (c), which is more than 15° F. cooler in inlet temperature.

Applying the same principle, when the engine is operated with an increased water schedule, speed limit, and active VIGV, the engine controller modifications enable the turbine to operate at an even higher power level, illustrated at point (d) on power curve 550. This is substantially equivalent to an even lower inlet temperature, illustrated at point (e) on original power curve 526. Specifically, the engine controller modifications impact the operating parameters that limit the operation of the water-injected engine: core airflow, core speed, and water-injection flow rate. More specifically, when demonstrated using a Brayton Cycle, the management of the inlet air by the VIGV system allows a cycle volume increase, and the core speed increase effectively increases the pressure ratio of the turbine, thus allowing a cycle pressure and mass flow increase. As a result, the area enclosed in a continuous Braton Cycle pressure versus volume, which represents the work output of the system, is increased.

As shown in FIG. 15, the modeling was completed using various combinations (+1 representing inclusion of the parameter, −1 representing exclusion of the parameter) of water injection (SPRINT), core engine shaft speed, variable inlet guide vane operation, and a passive clearance control (PCC) system, which was weighted to be a less significant factor during modeling. Modeling cycles were performed at an inlet temperature of 50° F. and at an inlet temperature of 80° F. As shown in the results, in each model cycle, the engine operating with the water injection, the VIGV, and the software modifications (represented by line 7 of each model cycle) produced a higher output.

The above-described methods provide a cost-effective and highly reliable means for enhancing gas turbine engine operation. The method includes modifying the gas turbine engine controller software to impact several operational predefined parameter limits such that enhanced turbine performance is facilitated. Specifically, operational parameter changes are made to the controller of an engine that includes water injection and variable inlet guide vanes, such that the engine is capable of operating with an increased water injection flow rate, an increased core engine speed, and with an increased inlet air flow. Accordingly, the turbine is operable with a reduced effective inlet temperature over a range of normal inlet temperatures. As a result, the combination of the VIGV and the controller modifications enables the turbine to operate with enhanced performance and output in a cost-effective and reliable manner.

Exemplary embodiments of turbines and engine controllers are described above in detail. The methods described are not limited to the specific turbine embodiments described herein, but rather, components of each method may be utilized independently and separately from other components described herein. Furthermore, components of each gas turbine engine may also be used in combination with other turbine components.

While the invention has been described in terms of various specific embodiments, those skilled in the art will recognize that the invention can be practiced with modification within the spirit and scope of the claims.

What is claimed is:

1. A method for operating a gas turbine engine including a high pressure compressor, a variable inlet guide vane assembly and a water injection apparatus for injecting water into a flow of the engine, said method comprising the steps of:

transmitting engine operating parameters including a temperature of the gas flow at an outlet of the high pressure compressor, T3, to an engine controller;

using the controller to regulate a flow of water injected into the gas flow and to adjust a relative position of the inlet guide vane assembly until engine full power is about reached as determined by a pre-defined T3 operating parameter limit; and adjusting the controller to then facilitate operation of the engine with an increased output without exceeding the pre-defined T3 operating parameter limit.

2. A method in accordance with claim 1 wherein adjusting the controller to facilitate operation of the engine with an increased output further comprises adjusting the controller to enable a turbine core speed increase.

3. A method in accordance with claim 1 wherein adjusting the controller to facilitate operation of the engine with an increased output further comprises adjusting the controller to enable a water flow injection rate increase.

4. A method in accordance with claim 1 wherein adjusting the controller to facilitate operation of the engine with an increased output further comprises adjusting the controller to enable a turbine core air flow increase.

5. A method in accordance with claim 1 further comprising adjusting the controller to facilitate improving the turbine engine heat rate.

6. A method in accordance with claim 1 wherein adjusting the controller to then facilitate operation of the engine with an increased output further comprises adjusting the controller to enable an increased gas turbine output.

7. A method in accordance with claim 1 wherein transmitting engine operating parameters further comprises transmitting operating parameters indicative of turbine core operating speed, turbine core airflow, and water injection flow rate.

8. A method for operating a gas turbine engine including a variable inlet guide vane assembly, said method comprising the steps of:

adjusting a relative position of the variable guide vane assembly based on feedback to an engine controller;

injecting water into the engine gas flow at a first flow rate until engine full power is about reached as determined by the engine controller, wherein at a specific effective engine inlet temperature, engine full power is limited by a pre-defined temperature of the gas flow at an outlet of a high pressure compressor, T3;

adjusting pre-defined limits within the engine controller to enable the engine to operate with a reduced effective engine inlet temperature; and re-accelerating the engine to full power without exceeding the pre-defined T3 temperature.

9. A method in accordance with claim 8 further comprising transmitting engine operating parameters indicative of turbine core operating speed, turbine core airflow, compressor discharge temperature, and water injection flow rate to the engine controller.

10. A method in accordance with claim 8 wherein adjusting pre-defined limits within the engine controller further comprises adjusting the pre-defined limits to enable an increase in the gas turbine engine nominal core speed at the same effective engine inlet temperature.

11. A method in accordance with claim 10 wherein adjusting pre-defined limits within the engine controller further comprises adjusting the pre-defined limits to enable an increase in the nominal water flow injection rate at the same effective engine inlet temperature.

12. A method in accordance with claim 10 wherein adjusting pre-defined limits within the engine controller further comprises adjusting the pre-defined limits to enable an increase in the nominal core air flow at the same effective engine inlet temperature.

13. A method in accordance with claim 10 wherein adjusting pre-defined limits within the engine controller further comprises adjusting the relative position of the variable inlet guide vanes to enable an increase in the nominal core air flow at the same effective engine inlet temperature.

14. A method in accordance with claim 10 wherein adjusting pre-defined limits within the engine controller further comprises adjusting the pre-defined limits to facilitate improving the gas turbine engine heat rate.

15. A method in accordance with claim 10 wherein adjusting pre-defined limits within the engine controller further comprises adjusting the pre-defined limits to enable an increase in the gas turbine engine heat rate at the same effective engine inlet temperature.

16. A method in accordance with claim 10 wherein adjusting pre-defined limits within the engine controller further comprises adjusting the pre-defined limits to enable an increase in the nominal gas turbine output at the same effective engine inlet temperature.

* * * * *